US011852949B1

(12) United States Patent
Lu et al.

(10) Patent No.: US 11,852,949 B1
(45) Date of Patent: Dec. 26, 2023

(54) HYBRID VARIFOCAL LENS

(71) Applicant: META PLATFORMS TECHNOLOGIES, LLC, Menlo Park, CA (US)

(72) Inventors: Lu Lu, Kirkland, WA (US); Wai Sze Tiffany Lam, Redmond, WA (US); Yusufu Njoni Bamaxam Sulai, Bothell, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 235 days.

(21) Appl. No.: 17/176,863

(22) Filed: Feb. 16, 2021

Related U.S. Application Data

(62) Division of application No. 16/037,880, filed on Jul. 17, 2018, now Pat. No. 10,948,801.

(51) Int. Cl.
*G02F 1/29* (2006.01)

(52) U.S. Cl.
CPC ............ *G02F 1/29* (2013.01); *G02F 1/294* (2021.01); *G02F 2202/40* (2013.01); *G02F 2203/28* (2013.01)

(58) Field of Classification Search
CPC .......... A61B 1/0019; A61B 2562/0242; A61B 5/0035; A61B 5/0059; A61B 5/0068; G02B 3/14; G02B 26/005; G02B 1/06; G02B 26/004; G02B 27/646; G02B 3/12; G02B 13/0075; G02B 27/0068; G02B 27/0172; G02B 5/3016; G02B 7/008; G02B 19/0014; G02B 19/0052; G02B 2027/011; G02B 21/0028; G02B 2207/115; G02B 23/243; G02B 23/26; G02B 27/0966; G02B 27/286; G02B 3/06; G02B 3/10; G02B 30/26; G02B 7/08

See application file for complete search history.

(56) References Cited

U.S. PATENT DOCUMENTS 10,546,430 B1 1/2020 Lu et al.
2010/0225834 A1 9/2010 Li

FOREIGN PATENT DOCUMENTS

JP 2006091606 * 4/2006 ............. G03B 15/05
WO WO 2016024161 * 2/2016 ............ G02B 13/009

* cited by examiner

*Primary Examiner* — Brandi N Thomas
(74) *Attorney, Agent, or Firm* — Pequignot + Myers; Matthew A. Pequignot

(57) ABSTRACT

A hybrid lens is disclosed including optically coupled varifocal lens and adaptive lens. The varifocal lens is configured for varying optical power of the hybrid lens, and an adaptive lens includes a voltage-controlled element for varying optical power of the adaptive lens in coordination with varying the optical power of the varifocal lens and responsive to variation of the optical power of the hybrid lens, for lessening an optical aberration of the hybrid lens. The hybrid lens may be used in head-mounted displays e.g. for lessening a vergence-accommodation conflict.

20 Claims, 13 Drawing Sheets

HYBRID VARIFOCAL LENS

REFERENCE TO RELATED APPLICATION

The present invention is a divisional of U.S. patent application Ser. No. 16/037,880 filed on Jul. 17, 2018 and incorporated herein by reference in its entirety.

TECHNICAL FIELD

The present disclosure relates to optical components and modules, and in particular to lenses having adjustable focal length, and display modules and headsets incorporating such lenses.

BACKGROUND

Head mounted displays (HMDs) are used to provide virtual scenery to a user, or to augment real scenery with additional information or additional virtual objects. Stereoscopic images can be displayed by providing separate images to each eye of the user, thus creating a perception of three-dimensional (3D) space. In some HMD systems, a head and/or eye position and orientation of the user are tracked, and the displayed 3D scenery is adjusted in real time depending on the user's head orientation and gaze direction to provide an illusion of the user immersed into a simulated or augmented three-dimensional scenery. The simulated 3D virtual environment, however, can cause discomfort, visual fatigue, and even nausea of a user resulting from a limited capability of some existing headsets to properly compensate for a discrepancy between eye vergence and eye visual distance accommodation, known as vergence-accommodation conflict.

BRIEF DESCRIPTION OF THE DRAWINGS

Exemplary embodiments will now be described in conjunction with the drawings, in which.

DETAILED DESCRIPTION

Figure 1:
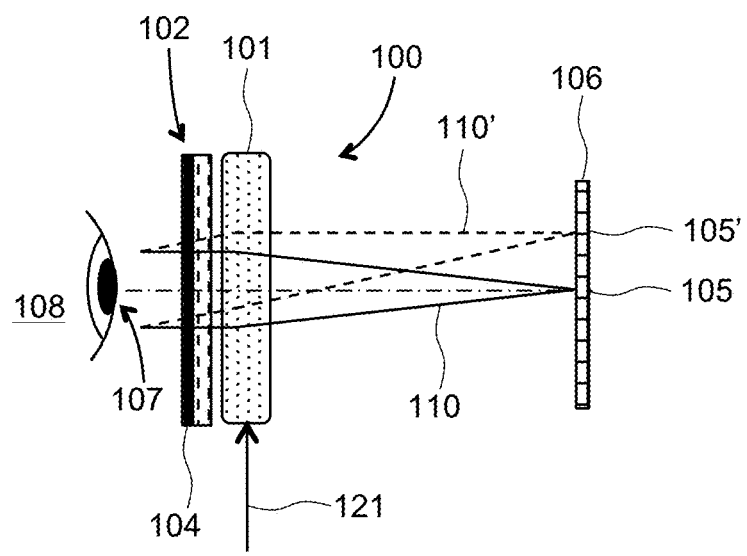
FIG. 1 is a side schematic view of a hybrid lens including a varifocal lens and an adaptive lens, in accordance with the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art.

The present disclosure relates to devices and methods for lessening vergence-accommodation conflict in various display systems including but not limited to head mounted displays (HMD) including near-eye displays (NED), and other artificial reality display systems. Herein, the term "artificial reality" encompasses virtual reality, augmented reality, mixed reality, hybrid reality, a combination thereof, and/or derivatives thereof.

The vergence-accommodation conflict in an HMD may be reduced by determining the vergence of user's eyes, and adjusting, in real time, a focusing power of a lens system used to project images from an electronic display into the user's eyes. However, such adjustment can cause various visual artifacts and aberrations of the displayed images.

In accordance with the present disclosure, there is provided a hybrid lens comprising a varifocal lens for varying optical power of the hybrid lens, and an adaptive lens optically coupled to the varifocal lens and comprising a voltage-controlled element for varying optical power of the adaptive lens in coordination with varying optical power of the varifocal lens and responsive to a variation of the optical power of the hybrid lens, for lessening an optical aberration of the hybrid lens.

The varifocal lens may include a liquid lens comprising a pair of immiscible fluids separated by a boundary having a voltage-variable radius of curvature for varying optical power of the liquid lens. The adaptive lens may include at least one of: a Pancharatnam-Berry phase (PBP) lens; a polarization volume holographic liquid crystal (LC) lens; or an LC Fresnel lens. A substrate of the adaptive lens may include at least one of: a glass substrate; a plastic substrate; or a sapphire substrate. The PBP lens may include at least one of a nano-patterned birefringent structure or a polymer-embedded LC layer. For embodiments where the voltage-controlled element comprises a first active PBP lens, the adaptive lens may further include a first switchable polarization rotator optically coupled to the first active PBP lens, and may further include a second active PBP lens and a second switchable polarization rotator, e.g. LC switchable half-wave waveplate, optically coupled to the second active PBP lens. The adaptive lens may be disposed in an optical path downstream of the varifocal lens.

In accordance with the present disclosure, there is further provided a hybrid lens apparatus comprising any of the hybrid lenses described above and a controller operably coupled to the varifocal lens and the voltage-controlled element of the adaptive lens and configured to vary the optical power of the varifocal lens in coordination with varying voltage applied to the voltage-controlled element, thereby lessening the optical aberration of the hybrid lens as optical power of the hybrid lens is varied. The varifocal lens may include a liquid lens comprising a pair of immiscible fluids separated by a boundary having a voltage-variable radius of curvature for varying optical power of the liquid lens. The controller may be configured to vary the radius of curvature of the boundary by varying a voltage applied to the liquid lens in coordination with varying a voltage applied to the voltage-controlled element of the adaptive lens, thereby lessening the optical aberration of the hybrid lens as the optical power of the liquid lens is varied. For example, the controller may be configured to increase the optical power of the adaptive lens when increasing the optical power of the liquid lens, and to decrease the optical power of the adaptive lens when decreasing the optical power of the liquid lens. In one embodiment, the adaptive lens includes an LC PBP lens, and the voltage-controlled element comprises a voltage-controlled polarization rotator. The adaptive lens may include a multifocal lens configured to switch the optical power of the adaptive lens between optical power values responsive to the controller adjusting optical power of the hybrid lens within predefined optical power sub-ranges. Each optical power value of the multifocal lens corresponds to a particular one of the predefined optical power sub-ranges of the hybrid lens.

An eye tracking system may be provided for the hybrid lens. The eye tracking system may be configured for determining a gaze convergence angle of eyes of a user. The controller may be operably coupled to the eye tracking system to adjust the optical power of the hybrid lens responsive to the gaze convergence angle determined by the eye tracking system.

In accordance with the present disclosure, there is further provided a method for adjusting optical power of a hybrid lens comprising a varifocal lens optically coupled to an adaptive lens, the method comprising varying optical power of the varifocal lens, and varying optical power of the adaptive lens in coordination with varying the optical power of the varifocal lens and responsive to a variation of the optical power of the hybrid lens, for lessening an optical aberration of the hybrid lens. The method may include e.g. increasing the optical power of the varifocal lens when increasing the optical power of the adaptive lens, and decreasing the optical power of the varifocal lens when decreasing the optical power of the adaptive lens. For embodiments where the adaptive lens comprises a multifocal lens, the method can further include switching the optical power of the adaptive lens between optical power values when adjusting optical power of the hybrid lens within predefined optical power sub-ranges. Each optical power value of the multifocal lens corresponds to a particular one of the predefined optical power sub-ranges of the hybrid lens. The method may also include determining a gaze convergence angle of eyes of a user, and the optical power of the hybrid lens may be adjusted responsive to the determined gaze convergence angle.

Referring now to FIG. 1, a hybrid lens 100 is configured to direct image light e.g. on-axis 110 and off-axis beams 110' of light emitted respectively by pixels 105, 105' of an electronic display 106 towards a pupil 107 of a user's eye 108. Light from each pixel 105, 105' may be collimated into a parallel or near-parallel, e.g. slightly diverging, light beam for entering the pupil 107 of the user's eye 108. To provide a varying optical power to match the eye vergence of the user, the hybrid lens 100 can include a varifocal lens 101. The varifocal lens 101 may be any type of lens capable of varying optical power, i.e. focusing or defocusing power, in a controllable manner. In one embodiment, the varifocal lens 101 varies its optical power responsive to an external control signal 121. An adaptive lens 102 is optically coupled to the varifocal lens 101. The adaptive lens 102 may be disposed downstream of to the varifocal lens 101, and may include a varifocal lens or a multi-focal lens, i.e. a varifocal lens switchable between a number of pre-defined optical power values. In the embodiment shown, the adaptive lens 102 includes a voltage-controlled element 104 for varying optical power of the adaptive lens 102 in coordination with varying the optical power of the varifocal lens 101 and responsive to a variation of optical power of the hybrid lens 100. The function of the adaptive lens 102 is to lessen an optical aberration of the hybrid lens 100. The aberration may increase as the optical power of the varifocal lens 101 changes. By way of example, spot size performance for the off-axis beam 110' may be degraded as the optical power of the hybrid lens 100 is varied, and the function of the adaptive lens 102 may include improving spot size performance for the off-axis beam 110'.

Figure 2:
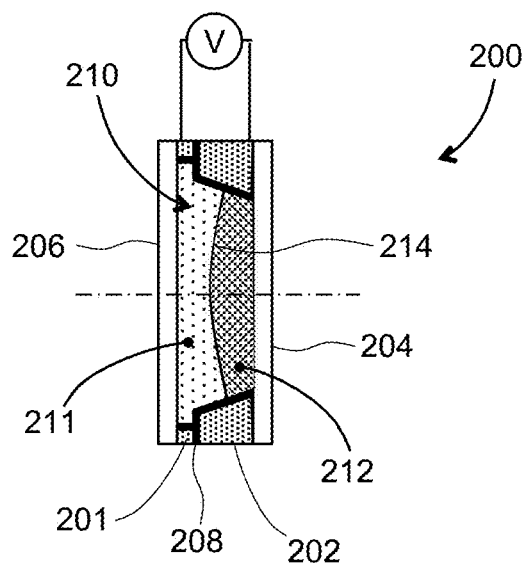
FIG. 2 is a side schematic view of an example liquid lens for use as the varifocal lens.

The varifocal lens 101 may include, for example, a compound refractive lens having components movable along optical axis, a liquid crystal (LC) lens e.g. a Pancharatnam-Berry phase (PBP) lens, an Alvarez lens having laterally translatable components, including an LC Alvarez lens, a liquid lens, or any other suitable varifocal lens. Referring to FIG. 2, a liquid lens 200 is one example embodiment of the varifocal lens 101 of FIG. 1. The liquid lens 200 of FIG. 2 includes a cavity 210 formed by first 201 and second 202 circular electrodes, a front window 204, and a rear window 206. The cavity 210 includes first 211 and second 212 immiscible fluids having different indices of refraction and separated by an inter-fluid boundary 214. The first 201 and second 202 circular electrodes are electrically insulated from each other by an insulation layer 208 spanning between the first 201 and second 202 circular electrodes and shown in FIG. 2 with a thick black line. In operation, when a voltage V is applied between the first 201 and second 202 electrodes, a radius of curvature of the inter-fluid boundary 214 changes due to a phenomenon known as electro-wetting. Since the first 211 and second 212 fluids have different refractive indices, a change of the radius of curvature of the inter-fluid boundary 214 results in a variation of optical power of the liquid lens 200. The front window 204 and the rear window 206 of the liquid lens 200 may be flat as shown, or may be curved to provide a constant focusing or defocusing power to the liquid lens 200. The immiscible first 211 and second 212 fluids may include an immiscible oil/water pair, or another suitable immiscible fluid pair. Furthermore, a flexible transparent membrane may be provided for a liquid lens for separating two media having different refractive indices.

The adaptive lens 102 may include, for example, a Pancharatnam-Berry phase (PBP) lens having optical power due to PBP, or geometrical phase effect due to a spatially varying birefringence. The adaptive lens 102 may also comprise a polarization volume holographic LC lens including a cholesteric LC layer between a pair of substrates each coated with an alignment layer. The cholesteric LC layer has a chiral axis extending between the substrates, e.g. oriented perpendicular to the planes of the alignment layers, and having a spatially varying azimuthal angle at the alignment layers. Such configuration can provide a Bragg-like structure comprised of cholesteric LC spirals for focusing or defocusing light. The adaptive lens 102 may also include an LC Fresnel lens having a plurality of Fresnel zones defined by radially varying pre-tilt angle of LC molecules. The optical power of such lenses can be switched by using a voltage-controlled polarization rotator as the voltage-controlled element 104. The voltage-controlled polarization rotator can be disposed upstream or downstream of the adaptive lens 102.

Figure 3A:
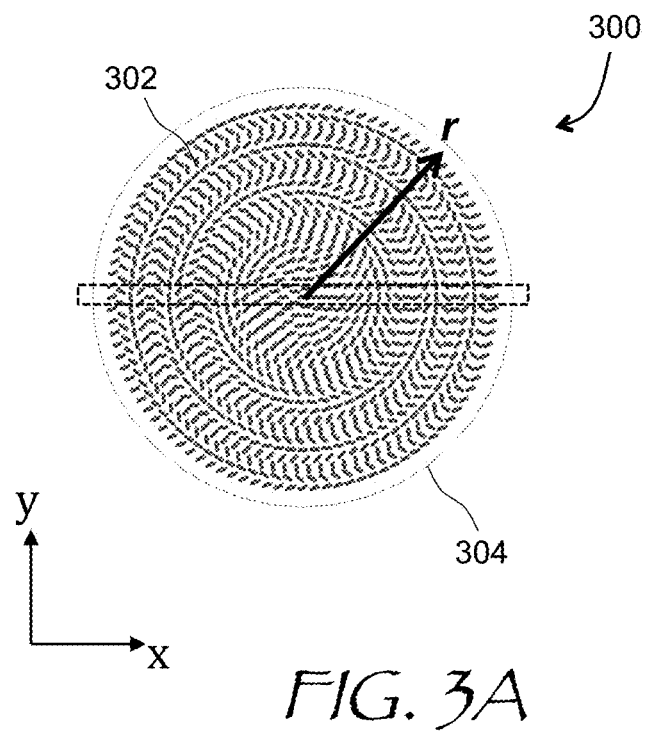
FIG. 3A is a frontal view of a liquid crystal (LC) PBP lens for use as the adaptive lens.
Figure 3B:
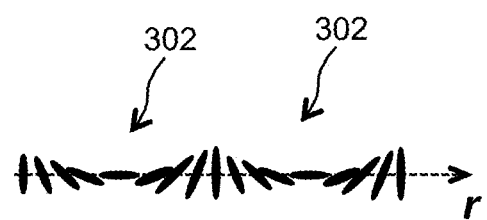
FIG. 3B is a magnified schematic view of LC molecules in an LC layer of the LC PBP lens of FIG. 3A.

The PBP adaptive lens embodiment will now be considered in more detail. Referring to FIGS. 3A and 3B, an LC PBP lens 300 includes LC molecules 302 in an LC layer 304. The LC molecules 302 are disposed in XY plane at a varying in-plane orientation depending on the radial distance r from the lens center. The orientation angle ϕ(r), i.e. the azimuthal angle, of the LC molecules 302 in the liquid crystal layer 304 of the LC PBP lens 300 is given by $$\phi(r) = \frac{\pi r^2}{2 f_0 \lambda_0} \quad (1a)$$

where $f_0$ is a desired focal length of the LC PBP lens 300, and $\lambda_0$ is wavelength of impinging light. The optical phase delay in the LC PBP lens 300 is due to Pancharatnam-Berry phase, or geometrical phase effect. An optical retardation R of the liquid crystal layer 304 having a thickness t is defined as R=tΔn, where Δn is the optical birefringence of the liquid crystal layer 304. At the optical retardation R of the LC layer 304 of $\lambda_0/2$, i.e. half wavelength, the accumulated phase delay P(r) due to the PBP effect can be expressed rather simply as P(r)=ϕ(r), or, by taking into account Eq. (1a) above, $$P(r) = \frac{\pi r^2}{r_0 \lambda_0} \quad (1b)$$

It is the quadratic dependence of the PBP P(r) on the radial coordinate r that results in the focusing, or defocusing, property of the LC PBP lens 300. This is different from a conventional LC lens, which utilizes changes in the tilt angle of LC molecules to provide a spatial phase distribution, and often has a discontinuity at a boundary of 2π modulo. A PBP lens 300 has the azimuthal angle ϕ(r) continuously and smoothly varying across the surface of the LC layer 304, as illustrated in FIG. 3B. Accordingly, the mapping of the azimuthal angle to PBP, i.e. P(r)=2ϕ(r) when R=$\lambda_0$/2, allows for a more drastic phase change without introducing discontinuities at a boundary of 2π modulo typically present in a conventional LC lens. It is further noted that a spatially varying birefringence for the geometrical phase effect in a PBP lens may also be provided by using a nano-patterned birefringent structure on a substrate, e.g. a structured nanomaterial or a metamaterial layer comprising a sandwich of thin metal and insulator layers. The spatially varying birefringence may also be provided by embedding LC molecules in a polymer layer and curing, e.g. UV-curing, the polymer.

The substrate for any adaptive lens described above may include at least one of a glass substrate, a plastic substrate, or a sapphire substrate.

In some embodiments, voltage can be applied to the LC layer 304 of the LC PBP lens 300, causing a nearly vertical reorientation of the LC molecules 302, erasing the PBP orientation of the molecules defined by Eq. (1a). To apply electric field to the LC layer 304, a pair of transparent indium tin oxide (ITO) layers may be provided on inner sides of substrates of the LC PBP lens 300, under alignment layers of the LC PBP lens 300. Such electrically switchable lenses are called herein "active lenses". The active LC PBP lenses may be used in either one, or both, of the varifocal 101 or adaptive 102 lenses of the hybrid lens 100.

Figure 4A:
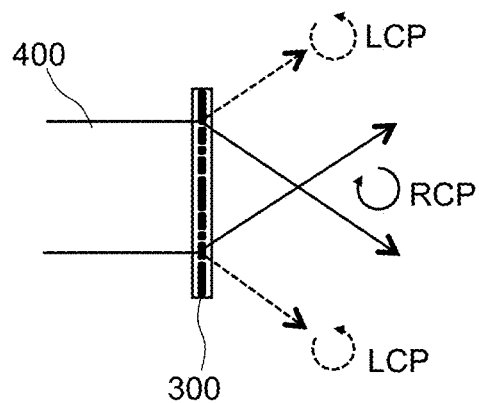
FIGS. 4A and 4B are side schematic views of an active embodiment of the LC PBP lens of FIG. 3A, showing light propagation in OFF (FIG. 4A) and ON (FIG. 4B) states of the active LC PBP lens, depending on polarization of incoming light.
Figure 4B:
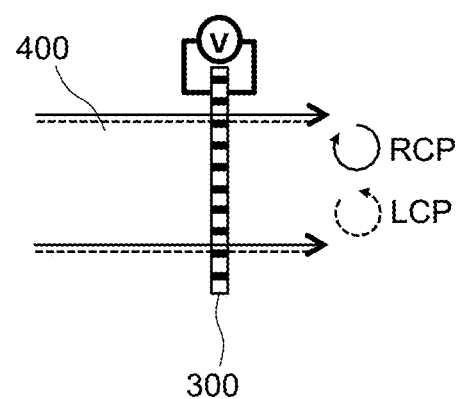

Optical performance of active LC PBP lenses is illustrated in FIGS. 4A and 4B. In FIG. 4A, the active LC PBP lens 300 is in OFF state, such that its LC molecules are disposed predominantly in-plane, as shown with thick black lines. In this embodiment, the optical retardation of the active LC PBP lens 300 is half a wavelength; thus, the active LC PBP lens 300 acts as a half-wave waveplate with spatially varying fast axis, changing the polarization of incoming light from left-circular polarized (LCP) to right-circular polarized (RCP), and vice versa. A sign, or direction, of the phase profile of a PBP device depends on polarization of an impinging optical beam 400. By way of example, when the incoming optical beam 400 is left-circular polarized (LCP), the phase delay at the lens center decreases toward the periphery of the LC PBP lens 300, such that the LC PBP lens 300 focuses the beam 400, which becomes right-circular polarized (RCP) as shown. The focused RCP beam 400 is shown with solid lines. When an incoming optical beam 400 is RCP, the phase delay at the lens center increases toward the periphery of the LC PBP lens 300, such that the LC PBP 300 defocuses the beam 400, which becomes left-circular polarized (LCP). The defocused LCP beam 400 is shown with dashed lines. Applying a voltage to the LC PBP lens 300 reorients the LC molecules substantially perpendicular to the substrates and parallel to the optical beam 400, as shown in FIG. 4B. As a result, the optical beam 400 remains unfocused, whether it is LCP or RCP. Thus, the active LC PBP lens 300 has a multi-focal lens property.

Figure 5:
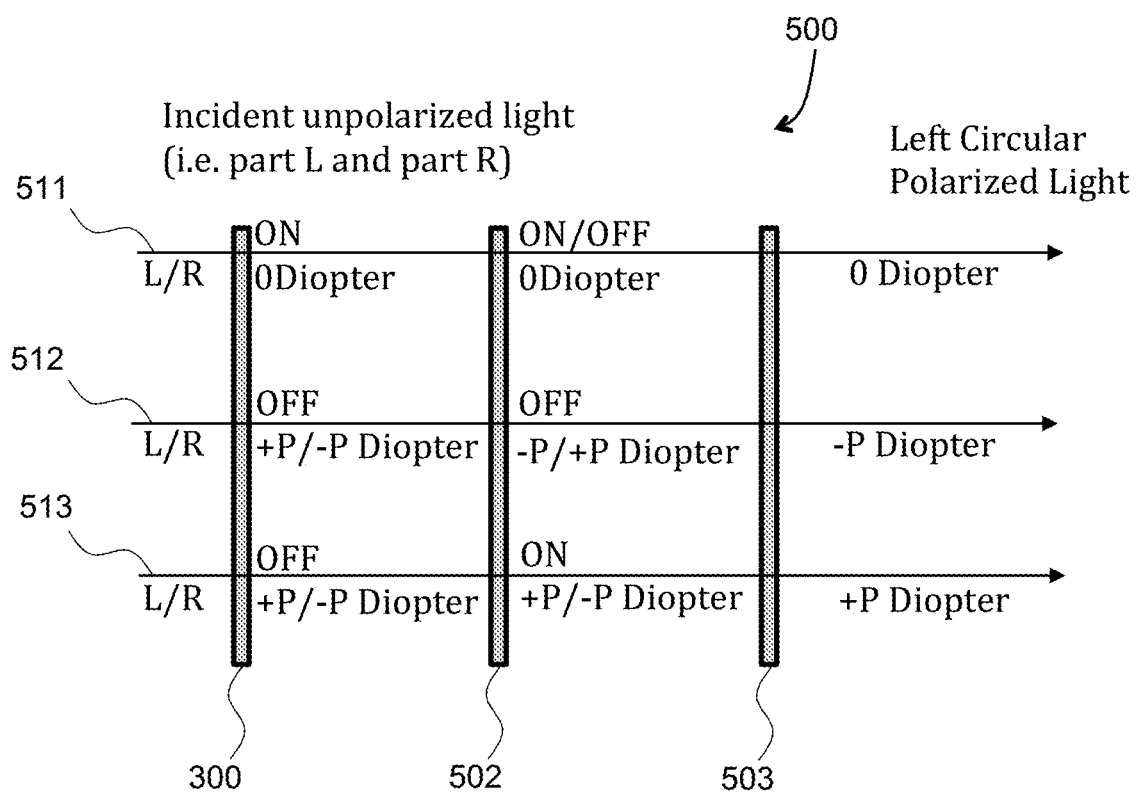
FIG. 5 is a schematic side view of an example adaptive lens including the PBP lens of FIG. 3A coupled to a switchable polarization rotator and a circular polarizer.

In accordance with the disclosure, the above described active LC PBP lens 300 may be used to construct a multi-focal embodiment of the adaptive lens 102, switchable between several non-zero optical powers or focal lengths. Referring to FIG. 5, an optical stack 500 includes the active LC PBP lens 300, a switchable LC half-wave waveplate 502 (FIG. 5) optically coupled to the active PBP lens 300, and a left-circular polarizer 503 optically coupled to the switchable LC half-wave waveplate 502. In this example, the switchable LC half-wave waveplate 502 functions as a switchable polarization rotator. The active LC PBP lens 300 includes a positive LC material, in which LC molecule orient parallel to the applied electric field, although a negative LC material could be used. The input light is not polarized, i.e. it generally includes both left-handed circular (L) and right-handed circular (R) polarizations. When the LC PBP lens 300 is in "ON" state, i.e. when the electric field is applied, the PBP structure defined by Eq. (1a) above is erased, thus the LC PBP lens 300 has optical power of 0 Diopter. In this state, as denoted at 511, the optical power of the entire stack 500 is 0 Diopter, i.e. the light remains unfocused. When the LC PBP lens 300 is in "OFF" state, i.e. when the electric field is not applied, the LC PBP orientation defined by Eq. (1a) is present, providing the optical power of P Diopter for L-polarized light and —P diopters for R-polarized light. When the switchable half-wave waveplate 502 is in OFF state, i.e. when the electric field is not applied, the half-wave retardation is present, as denoted at 512. As a result, the R-polarized light at the optical power −P diopters becomes L-polarized light, which is passed through the left-circular polarizer 503. Thus, the stack 500 has the optical power of —P Diopter in the state 512. When the switchable half-wave waveplate 502 is in ON state, i.e. when the electric field is applied, the half-wave retardation is erased, and the L-polarized light remains L-polarized, as denoted at 513. Thus, the stack 500 has the optical power of +P Diopter in the state 513.

In a functionally equivalent configuration of the optical stack 500, the left-circular polarizer 503 may be disposed upstream of the LC PBP lens 300, and the switchable LC half-wave waveplate 502 may be disposed downstream of the left-circular polarizer 503 and upstream of the LC PBP lens 300. The left-circular polarizer 503 may include a quarter-wave waveplate followed by a linear polarizer. A right-circular polarizer may be used in place of the left-circular polarizer 503. A switchable twisted nematic (TN) LC cell may also be used in place of the switchable LC half-wave waveplate 502.

Figure 6:
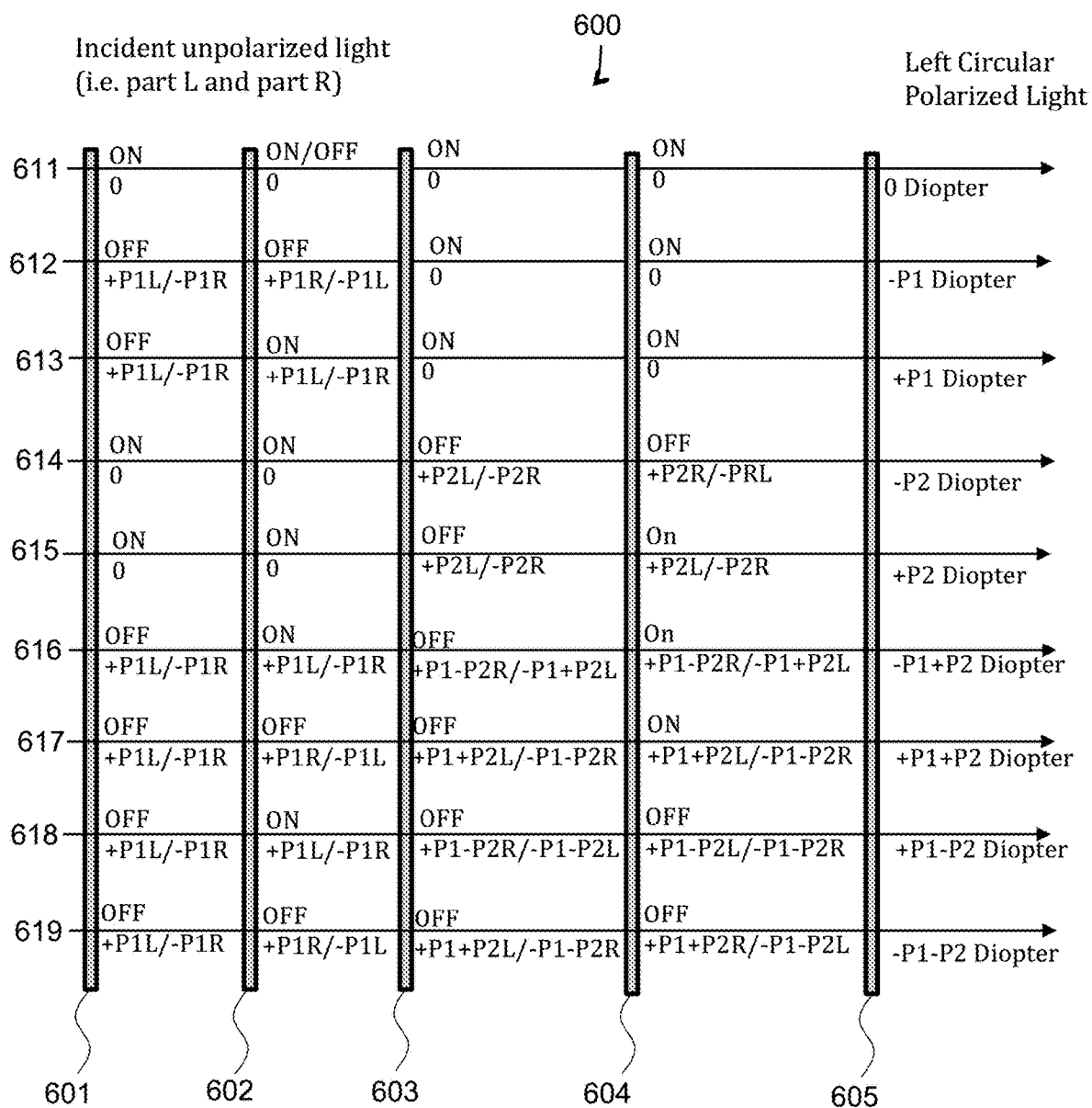
FIG. 6 is a schematic side view of an example adaptive lens including a couple of active, or switchable, PBP lenses and a couple of switchable polarization rotators and a circular polarizer.

By combining more switchable LC PBP devices and switchable polarization rotators, the number of switchable optical powers of the stack can be further increased. Referring to FIG. 6, an optical stack 600 includes first 601 and second 603 LC PBP lenses, first 602 and second 604 LC switchable polarization rotators, e.g. LC half-wave waveplates, and a left-circular polarizer 605. In this example, the LC PBP lenses 601 and 603 include positive LC material for certainty, although a negative material could be used. The input light is not polarized, i.e. it includes both left-handed circular (L) and right-handed circular (R) polarizations. When both LC PBP lenses 601 and 603 are in "ON" state, their optical power is zero, so that the optical power of the entire stack 600 is zero (state 611) regardless of the state of the first 602 and second 604 LC half-wave waveplates. When the first LC PBP lens 601 is in "OFF" state, the local retardation of the layer is half-wave and accordingly, the first LC PBP lens 601 has a non-zero optical power e.g. +P1 for L-polarized light (+P1L) and —P1 for R-polarized light (−P1R). Then, depending on the state of the first LC switchable half-wave waveplate 602, the resulting optical power of the stack 600 can be —P1 Diopter (state 612) or +P1 Diopter (state 613). Similarly, when the second LC PBP lens 603 is in "OFF" state, it has a non-zero optical power e.g. +P2 for L-polarized light (+P2L) and —P2 for R-polarized light (−P2R). Then, depending on the state of the second LC switchable half-wave waveplate 604, the resulting optical power of the stack 600 can be —P2 Diopter (state 614) or +P2 Diopter (state 615). In the remaining states 615-619 of the stack 600, the first 601 and second 603 LC PBP lenses are in "OFF" state and thus always provide non-zero optical power depending on polarization. Depending on the state of the first 602 and second 604 LC switchable half-wave waveplates, the resulting optical powers become:

−P1+P2 Diopter (state 616, the first LC half-wave waveplate 602 is ON and the second LC half-wave waveplate 604 is ON);

+P1+P2 Diopter (state 617, the first LC half-wave waveplate 602 is OFF and the second LC half-wave waveplate 604 is ON);

+P1−P2 Diopter (state 618, the first LC half-wave waveplate 602 is ON and the second LC half-wave waveplate 604 is OFF); and −P1−P2 Diopter (state 619, the first LC half-wave waveplate 602 is OFF and the second LC half-wave waveplate 604 is OFF).

In a functionally equivalent configuration of the optical stack 600, the left-circular polarizer 605 may be disposed upstream of the first LC PBP lens 601, and the first switchable LC half-wave waveplate 602 may be disposed downstream of the left-circular polarizer 605 and upstream of the first LC PBP lens 601. In this embodiment, the second switchable LC half-wave waveplate 604 is disposed downstream of the first LC PBP lens 601 and upstream of the second LC PBP lens 603. The left-circular polarizer 605 may include a quarter-wave waveplate followed by a linear polarizer. Similarly to the stack 500 of FIG. 5, a right-circular polarizer may be used in place of the left-circular polarizer 605 in the stack 600 of FIG. 6, and switchable twisted nematic (TN) LC cells may be used in place of the LC half-wave waveplates 602, 604.

Figure 7A:
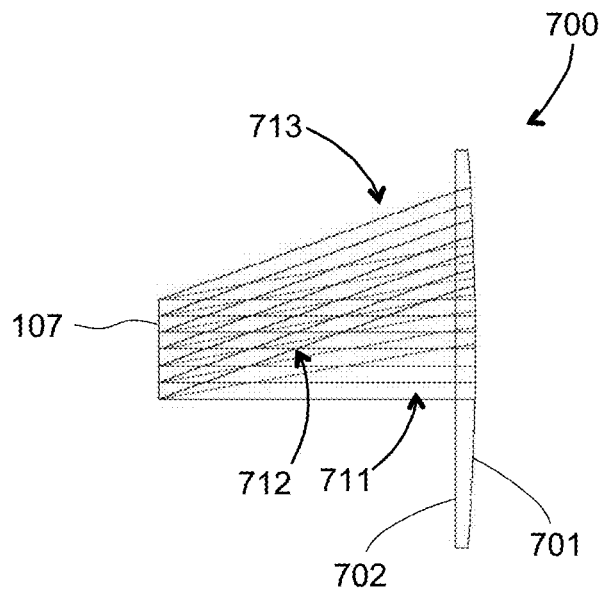
FIGS. 7A and 7B are ray-trace diagram and spot diagram, respectively, for a refractive lens having one surface with optical power.
Figure 7B:
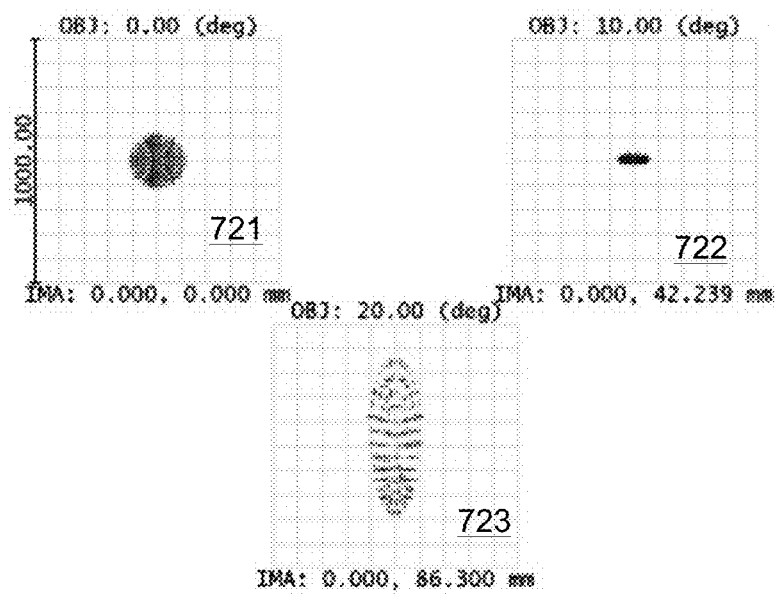

The aberration reducing properties of the varifocal 101—adaptive 102 lens combination will now be illustrated using examples of conventional refractive lenses for simplicity. Referring to FIG. 7A, a plano-convex refractive lens 700 includes a convex, i.e. a positive optical power, front surface 701 and a flat, i.e. a zero optical power, rear surface 702. Three ray bundles are traced, an on-axis ray bundle 711, a 10 degrees off-axis ray bundle 712, and a 20 degrees off-axis ray bundle 713. The rays are traced from the pupil 107 of a users' eye, to a display plane, not shown. In an actual display, the light is traveling in the opposite direction, i.e. from the display to the eye; however tracing rays from the pupil 107 back to the display plane conveniently enables evaluation of optical aberrations by estimating a spot size at the display plane. Such spots are depicted in FIG. 7B, including an on-axis spot 721 corresponding to the on-axis ray bundle 711; a 10 degrees off-axis spot 722 corresponding to the 10 degrees off-axis ray bundle 712; and a 20 degrees off-axis spot 723 corresponding to the 20 degrees off-axis ray bundle 713. On all three spot diagrams, the scale is 1000 micrometers as shown. The radius of curvature of the front surface 701 of the plano-convex lens 700 has been optimized to lessen an average value of the three spots 721-723. One can see that the rays are focused rather poorly, especially for the on-axis 711 and 20 degree off-axis 713 ray bundles. In this example, the convex front lens surface 701 corresponds to a varifocal lens, and the flat rear lens surface 702 corresponds to no lens, i.e. an absent adaptive lens.

Figure 8A:
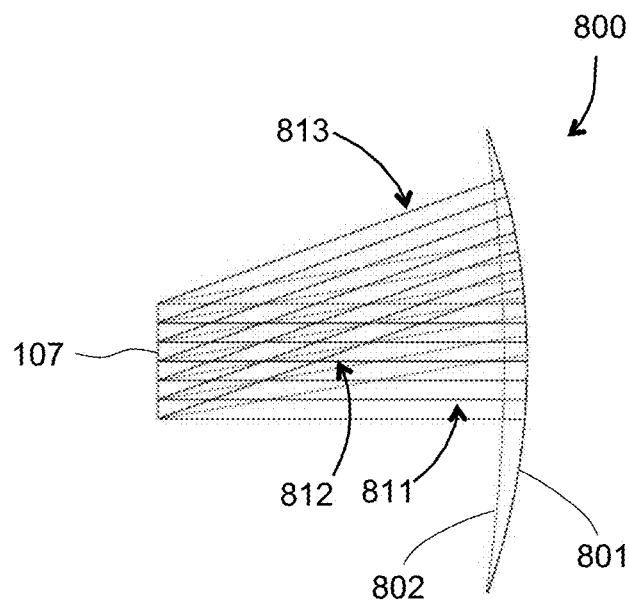
FIGS. 8A and 8B are ray-trace diagram and spot diagram, respectively, for a refractive lens having two surfaces each with optical power.
Figure 8B:
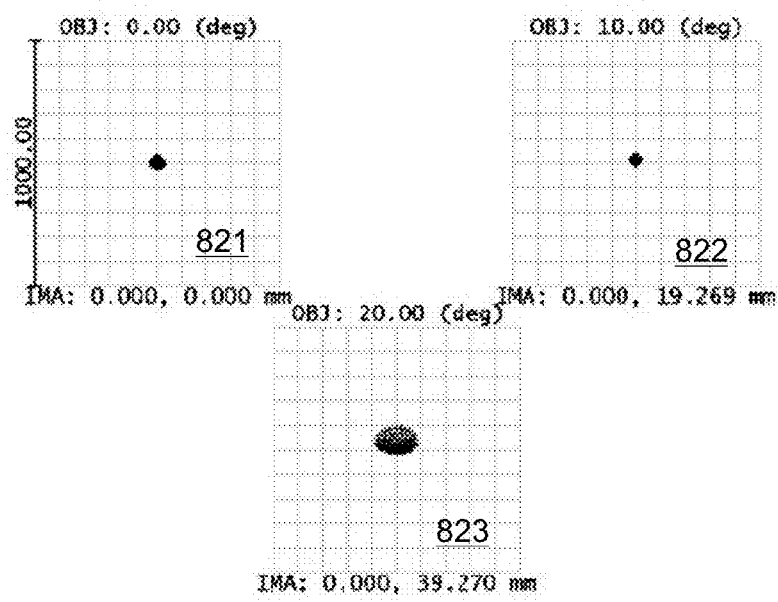

Turning now to FIG. 8A, a concave-convex refractive lens 800 includes a convex, i.e. a positive optical power, front surface 801 and a concave, i.e. a negative optical power, rear surface 802. Three ray bundles are traced, an on-axis ray bundle 811, a 10 degrees off-axis ray bundle 812, and a 20 degrees off-axis ray bundle 813. The rays are traced from the pupil 107 to the display plane. In this example, the convex front lens surface 801 corresponds to a varifocal lens, and the flat rear lens surface 702 corresponds to an adaptive lens, each having a non-zero optical power. The resulting spot diagrams are shown in FIG. 8B, including an on-axis spot 821 corresponding to the on-axis ray bundle 811; a 10 degrees off-axis spot 822 corresponding to the 10 degrees off-axis ray bundle 812; and a 20 degrees off-axis spot 823 corresponding to the 20 degrees off-axis ray bundle 813. On all three spot diagrams, the same scale as in FIG. 7B, i.e. 1000 micrometers, is used. The radius of curvature of the front 801 and rear 802 surfaces of the concave-convex lens 800 has been optimized to lessen an average value of the three spots 821-823. One can see a significant improvement of the spot sizes of the spots 821, 822, and 823 in comparison with the respective spots 721, 722, and 723 of FIG. 7B. Thus, using the adaptive lens 102 in combination with the varifocal lens 101 (FIG. 1) can reduce aberrations, e.g. spherical aberration and off-axis astigmatism, of the hybrid lens 100. It is noted that any of the lens types described above can be used for any one or both of the adaptive lens 102 or the varifocal lens 101. In other words, the term "hybrid lens" does not necessarily imply that the varifocal 101 and adaptive 102 lenses need to be of different lens types.

Figure 9A:
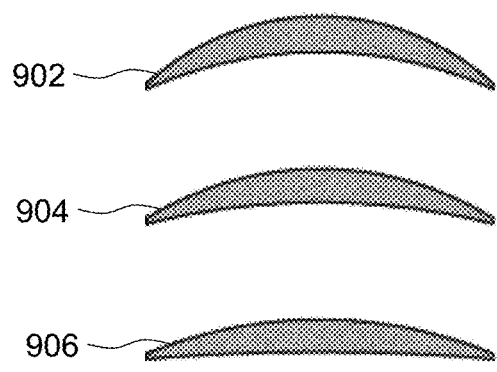
FIG. 9A is a side cross-sectional view of +4 Diopter lenses having different base curves.
Figure 9B:
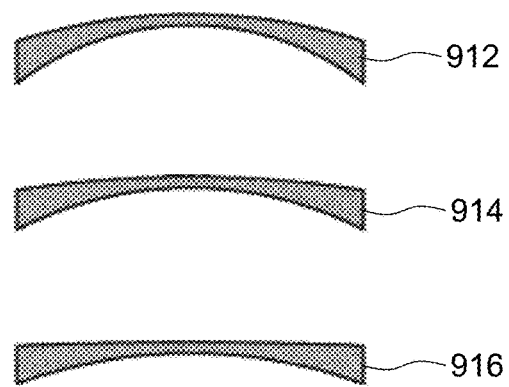
FIG. 9B is a side cross-sectional view of −4 Diopter lenses having different base curves.

The selection of ratios of optical powers of the varifocal 101 and adaptive 102 lenses may depend on a technology-dependent switchable or tunable optical power range, specific optical configurations in which the hybrid lens 100 is used, etc. More than one solution for the optical power ratios of the varifocal 101 and adaptive 102 lenses may exist, and the preferable one may or may not depend on a particular application or configuration. This is illustrated in FIGS. 9A and 9B using examples of prescription lenses with the optical power of +4 Diopters 902, 904, 906 (FIG. 9A) and −4 Diopters 912, 914, 916 (FIG. 9B). In FIGS. 9A and 9B, even though the front and rear lens surface curvatures are different, the resulting optical power of the lenses 902-906 is the same +4 Diopters, and the resulting optical power of the lenses 912-916 is the same −4 Diopters.

Figure 10:
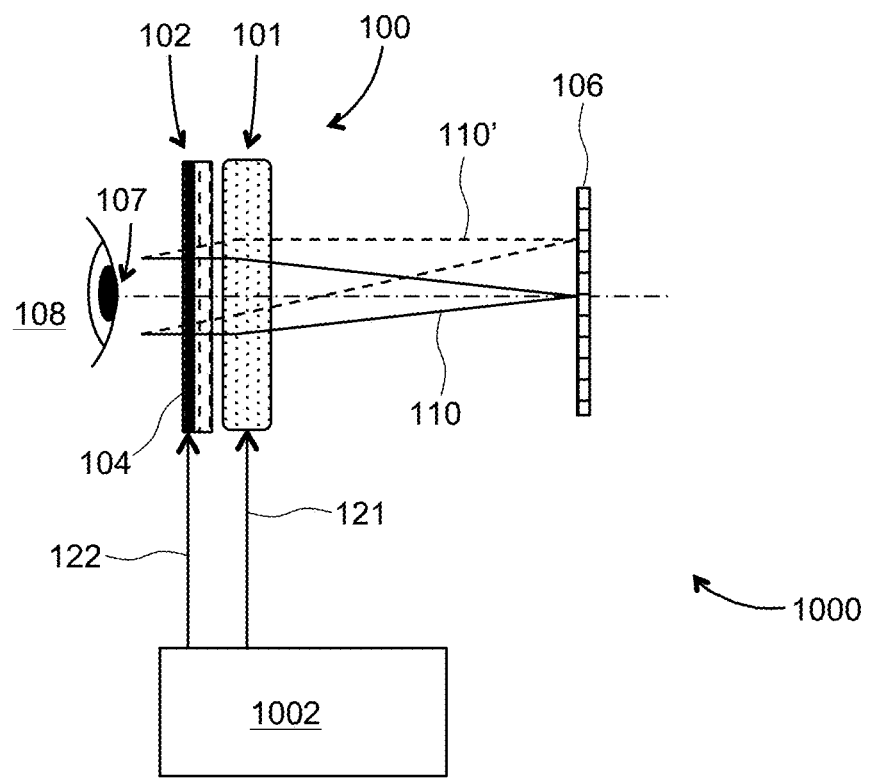
FIG. 10 is a schematic view of an apparatus for varying optical power of the hybrid lens of FIG. 1.

Turning to FIG. 10, a hybrid lens apparatus 1000 includes the hybrid lens 100 of FIG. 1 and a controller 1002 operably coupled to the varifocal lens 101 and the voltage-controlled element 104 of the adaptive lens 102. The controller 1002 may be configured to vary the optical power of the varifocal lens 101 by providing the control signal 121 to the varifocal lens 101. The varying is done in coordination with varying voltage 122 applied to the voltage-controlled element 104 of the adaptive lens 102, to adjust the optical power of the adaptive lens 102. The coordinated variation of optical power of the varifocal 101 and adaptive 102 lenses may be pre-determined and selected to reduce optical aberrations of the entire hybrid lens 100 within a pre-defined set of sub-ranges of optical powers of the hybrid lens 100. By way of a non-limiting example, the coordinated variation may ensure that the spot sizes for the on-axis 110 and off-axis 110' optical beams are below a threshold at any optical power setting of the hybrid lens 100 within any one of the set of pre-defined sub-ranges.

In one embodiment, the varifocal lens 101 includes a liquid lens, e.g. the liquid lens 200 of FIG. 2 comprising the pair of immiscible fluids 211, 212 separated by the boundary 214. The adaptive lens 102 may include at least one LC PBP lens, e.g. the LC PBP lens 100 of FIG. 1, the LC PBP stack 500 of FIG. 5, or the LC PBP stack 600 of FIG. 6. As explained above, the boundary 214 has a voltage-variable radius of curvature, which varies the optical power of the liquid lens 200. The controller 1002 can vary the radius of curvature of the boundary 214 by varying the voltage applied to the liquid lens 200 (FIG. 2), and varying voltages applied to e.g. the LC PBP stack 600 to switch the LC PBP stack 600 between nine pre-defined optical powers. Varying the voltages is performed in a coordinated manner, so as to lessen optical aberrations of the hybrid lens 100 while varying the optical power of the hybrid lens 100. For example, the controller 1002 can be configured to increase the optical power of the stack 600 when increasing the optical power of the liquid lens 200, and to decrease the optical power of the stack 600 when decreasing the optical power of the liquid lens 200. A reverse configuration, where the optical power of one lens is increased while the optical power of the other lens is decreased, is also possible. It is to be understood that the liquid lens 200 and the LC PBP stack 600 are only illustrative examples, and different combinations of lenses with variable or switchable optical power can be used for any, or both, of the varifocal lens 101 and the adaptive lens 102.

In one embodiment, the adaptive lens 102 includes a multifocal lens configured to switch the optical power of the adaptive lens 102 between optical power values responsive to the controller adjusting optical power of the hybrid lens 100 within predefined optical power sub-ranges, such that each optical power value of the multifocal lens corresponds to a particular one of the predefined optical power sub-ranges of the hybrid lens 100. To that end, the values and ranges of the optical power of both lenses may be stored as a look-up table. By way of example, the hybrid lens 100 may have optical power variable between −2 Diopter and −0.5 Diopter. In this embodiment, the varifocal lens 101 may have optical power variable between 4 Diopter and 6 Diopter, and the adaptive lens may have optical power switchable between −6 Diopter and −6.5 Diopter with the step of 0.125 Diopter for each 0.5 Diopter optical power sub-range of the 2 Diopter optical power range of the varifocal lens 101, i.e. 4 to 4.5 Diopter; 4.5 to 5 Diopter; 5 to 5.5 Diopter; and 5.5 to 6 Diopter.

Figure 11:
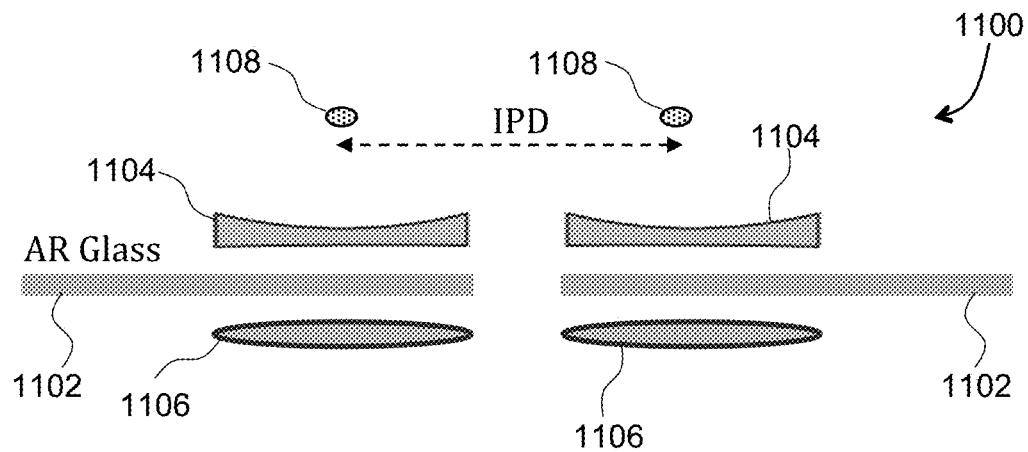
FIG. 11 is a schematic cross-sectional view of an augmented reality (AR) display including a hybrid lens of the present disclosure.

Referring to FIG. 11, an augmented reality (AR) display 1100 of the present disclosure includes an AR optics block, or "glass" 1102, coupled to adjustable lenses 1104, which may include the hybrid lens 100 of FIG. 1. The function of the hybrid lens 100 in the AR display 1100 is to dynamically adjust focus of light provided by the AR glass 1102, e.g. to lessen the vergence-accommodation conflict. A second set of adjustable lenses 1106 may be provided to bring images of real-world objects to the plane of the AR glass, to make sure the virtual objects generated by the display and the real objects are both in-focus at the same time. The lenses 1106 may also include hybrid lenses of the present disclosure, e.g. the hybrid lenses 100. Two sets of optics provide two exit pupils 1108 spaced apart at a typical inter-pupillary distance (IPD) of a human user. FIG. 3B shows a virtual reality (VR) display 1200. The VR display 1200 is similar to the AR display 1100, but lacks the second adjustable lenses 1106, since no real-world scenery is observed.

Figure 13:
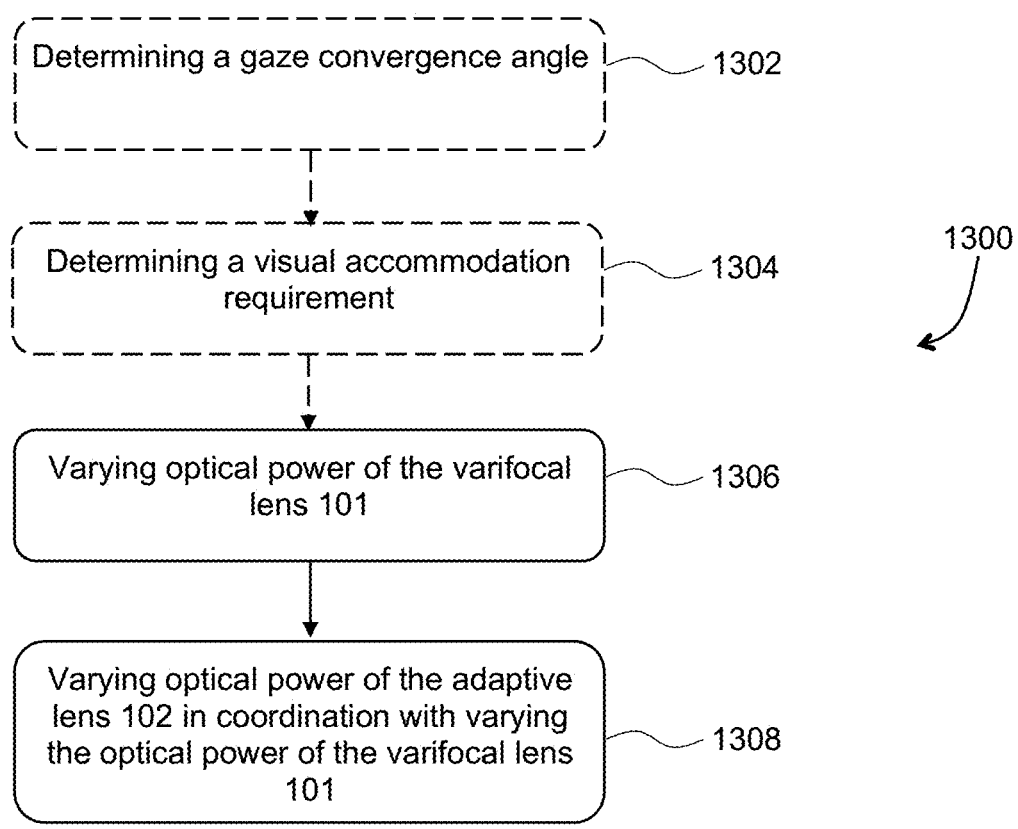
FIG. 13 is a flow chart of a method for adjusting optical power of a hybrid lens of the present disclosure.

Turning to FIG. 13, a method 1300 for adjusting optical power of a hybrid lens, such as the hybrid lens 100 of FIG. 1, is presented. The method 1300 includes varying (1306) the optical power of the varifocal lens 101, and varying (1308) optical power of the adaptive lens 102 in coordination with varying the optical power of the varifocal lens 101. As explained above, the optical power of the adaptive lens 102 can be varied responsive to variation of the optical power of the hybrid lens, for lessening an optical aberration of the hybrid lens 100. For example, when the optical power of the hybrid lens 100 needs to be set to a certain value e.g. 4 Diopter, the optical power of the varifocal lens can be set to 7 Diopter, while the optical power of the adaptive lens 102 can be set to 4−7=−3 Diopter. A look-up table may be provided e.g. having a top row for the optical power value sub-ranges of the hybrid lens 100, a second row for the corresponding optical power value sub-ranges of the varifocal lens 101, and a third row for the corresponding optical values (not ranges) of the multi-focal adaptive lens 102 to match the optical power value sub-ranges of the hybrid lens 100.

Figure 12:
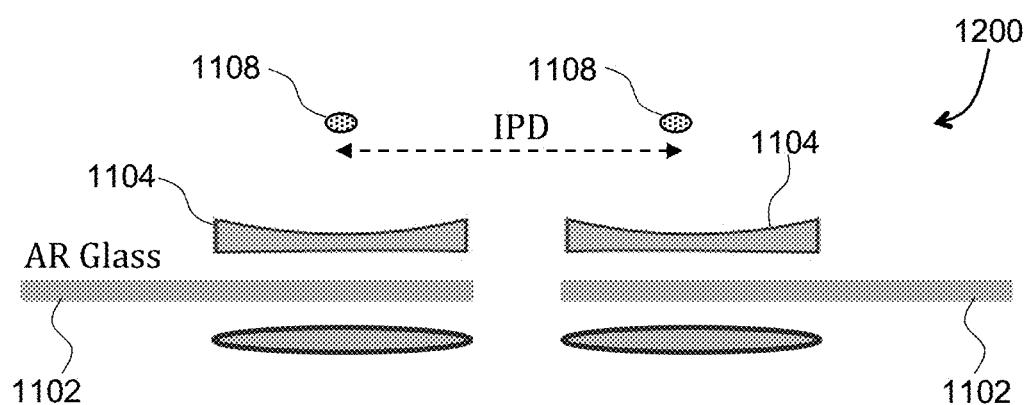
FIG. 12 is a schematic cross-sectional view of a virtual reality (VR) display including a hybrid lens of the present disclosure.

The method 1300 may optionally include determining (1302) a gaze convergence angle of eyes of a user e.g. in the AR display 1100 of FIG. 11 or VR display 1200 of FIG. 12, and determining (1304) a corresponding visual accommodation requirement, that is, a focusing power of the adjustable lenses 1104 which, as noted above, may include the hybrid lenses 100. Then, the optical power of the hybrid lenses 100 may be adjusted (1306, 1308) responsive to the determined visual accommodation requirement.

Figure 14:
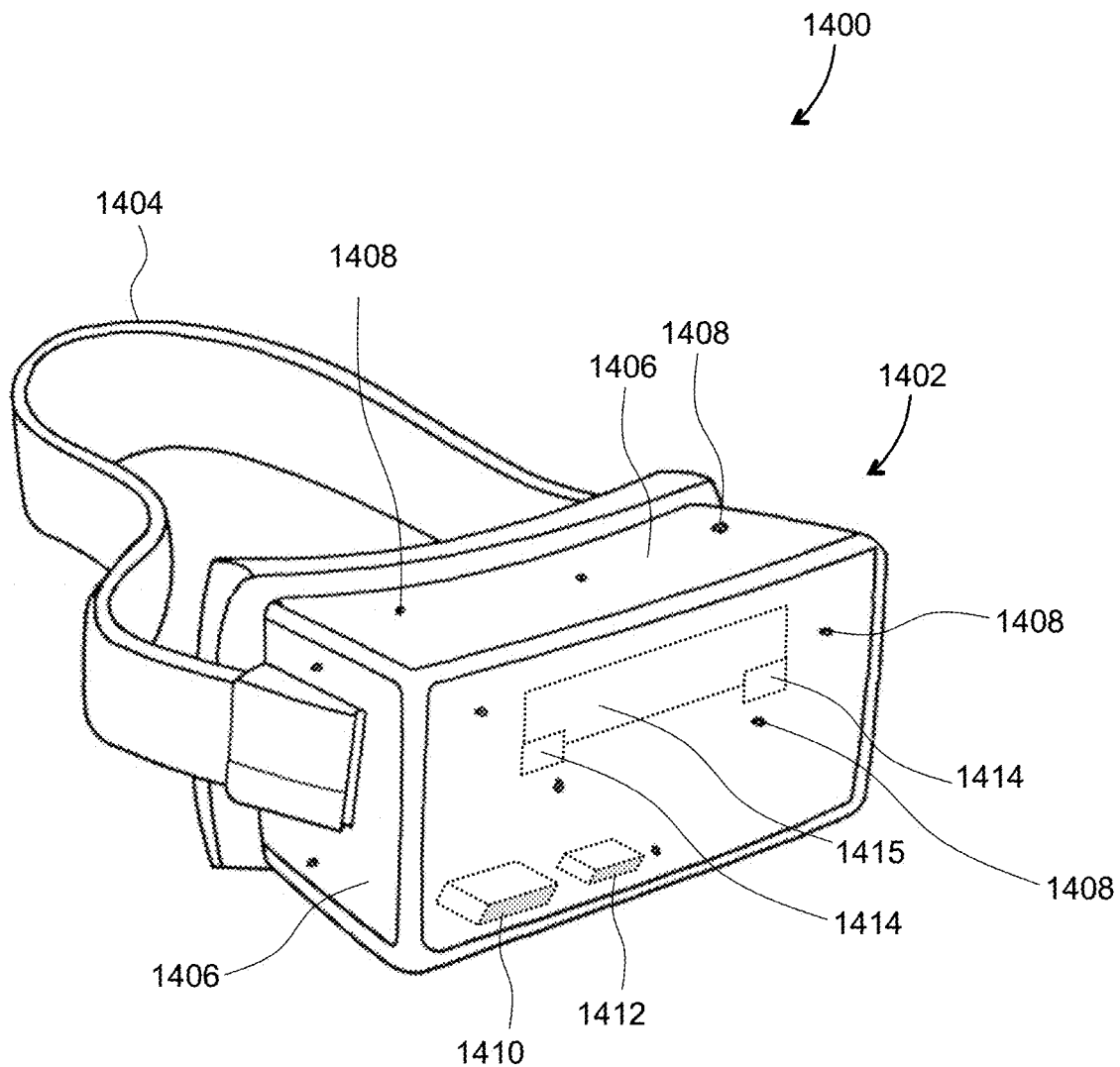
FIG. 14 is an isometric view of a head-mounted display (HMD) incorporating a hybrid lens of the present disclosure.

Turning to FIG. 14, a head-mounted display (HMD) 1400 may include any of the hybrid lenses described above. The HMD 1400 may provide content to a user as a part of an artificial reality system. The HMD 1400 may augment views of a physical, real-world environment with computer-generated imagery and/or to generate an entirely virtual 3D imagery. The HMD 1400 may include a front body 1402 and a head band 1404. The front body 1402 is configured for placement in front of eyes of a user, and the head band 1404 may be stretched to secure the front body 1402 on the user's head. A display module 1415, such as the AR display 1100 of FIG. 11 or the VR display 1200 of FIG. 12, may be disposed in the front body 1402 for presenting imagery to the user. Sides 1406 of the front body 1402 may be opaque or transparent.

In some embodiments, the front body 1402 includes locators 1408, an inertial measurement unit (IMU) 1410 for tracking acceleration of the HMD 1400, and position sensors 1412 for tracking position of the HMD 1400. The locators 1408 are traced by an external imaging device of a virtual reality system, such that the virtual reality system can track the location and orientation of the entire HMD 1400. Information generated by the IMU and the position sensors 1412 may be compared with the position and orientation obtained by tracking the locators 1408, for improved tracking of position and orientation of the HMD. Accurate position and orientation is important for presenting appropriate virtual scenery to the user as the latter moves and turns in 3D space.

The HMD 1400 may further include an eye tracking system 1414, which determines orientation and position of user's eyes in real time. The obtained position and orientation of the eyes allows the HMD 1400 to determine the gaze direction of the user and to adjust the image generated by the display module 1415 accordingly. In one embodiment, the vergence, that is, the convergence angle of the individual gaze directions of user's eyes, is determined. The optical power of the hybrid lenses 100 may then be adjusted depending on the vergence to reduce or lessen the vergence-accommodation conflict. In one embodiment, the main collimating and redirecting function is performed by dedicated non-adjustable lenses, and the hybrid lenses of this disclosure are used for fine focus adjustment.

Figure 15A:
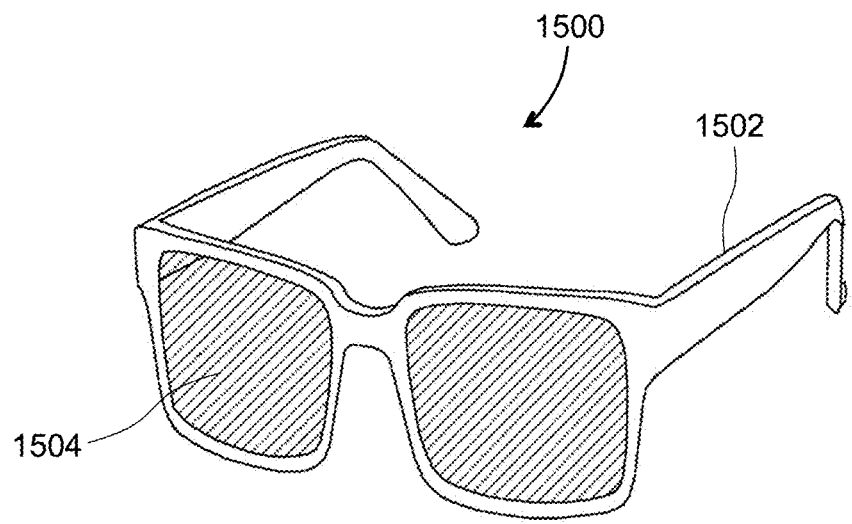
FIG. 15A is an isometric view of an eyeglasses form factor near-eye AR/VR display incorporating a hybrid lens of the present disclosure.
Figure 15B:
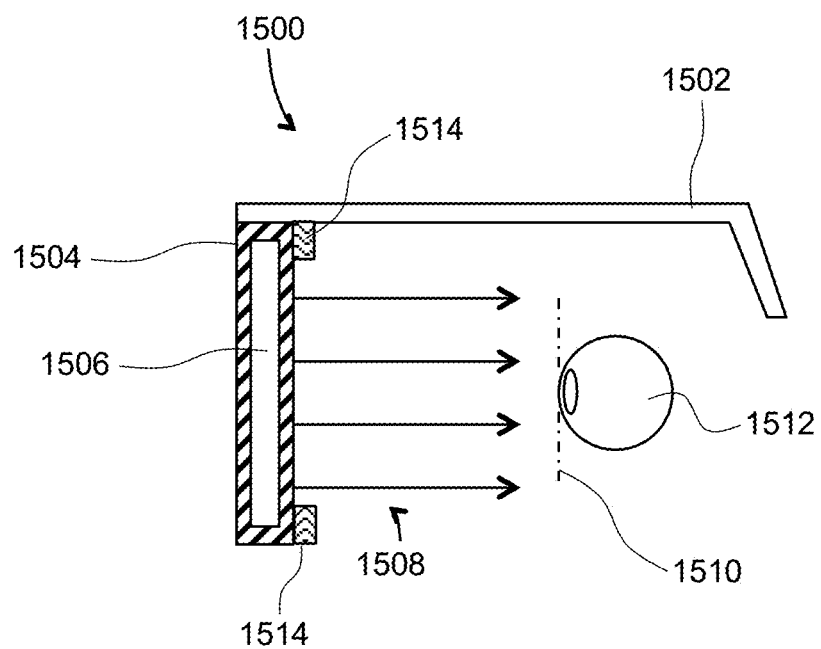
FIG. 15B is a side cross-sectional view of the display of FIG. 15A.

Referring now to FIGS. 15A and 15B, a near-eye AR/VR display 1500 is an embodiment of an HMD having a frame 1502 in form of a pair of eyeglasses. A display 1504 includes a display assembly 1506, for example the AR display 1100 of FIG. 11 or the VR display 1200 of FIG. 12. The display assembly 1506 (FIG. 15) provides image light 1508 to an eyebox 1510, i.e. a geometrical area where a good-quality image may be presented to a user's eye 1512. The display assembly 1506 may include a separate VR/AR display module for each eye, or one display module for both eyes. By way of example, an optical switching device may be coupled to a single electronic display for directing images to the left and right eyes of the user in a time-sequential manner, one frame for left eye and one frame for right eye. An electronic display of the display assembly 1506 may include, without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. More generally, such a display may be provided for any of the display modules or systems disclosed herein. The near-eye AR/VR display 1500 may also include an eye-tracking system 1514 for determining, in real time, the gaze direction and/or the vergence angle of the user's eyes 1512. The determined vergence angle may then be used to obtain the Diopter value of the display's varifocal lenses for lessening the vergence-accommodation conflict.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for adjusting optical power of a hybrid lens for collimating image light, the hybrid lens comprising a varifocal lens optically coupled to an adaptive lens, the method comprising:

varying optical power of the varifocal and adaptive lenses in coordination with one another based on a predetermined mutual variation of optical power for lessening an off-axis aberration of the hybrid lens with respect to the image light for each sub-range of a pre-defined set of sub-ranges of optical powers of the hybrid lens with respect to the image light.

2. The method of claim 1, further comprising increasing the optical power of the varifocal lens when increasing the optical power of the adaptive lens.

3. The method of claim 1, further comprising decreasing the optical power of the varifocal lens when decreasing the optical power of the adaptive lens.

4. The method of claim 1, wherein the varifocal lens comprises a liquid lens, and wherein varying the optical power of the varifocal lens comprises varying the optical power of the liquid lens.

5. The method of claim 1, further comprising determining a gaze convergence angle of eyes of a user, wherein the optical power of the hybrid lens is adjusted responsive to the determined gaze convergence angle.

6. The method of claim 1, wherein the adaptive lens comprises a multifocal lens, the method further comprising switching the optical power of the multifocal lens between optical power values when adjusting optical power of the hybrid lens within the pre-defined optical power sub-ranges.

7. The method of claim 6, wherein each optical power value of the multifocal lens corresponds to a particular one of the pre-defined optical power sub-ranges of the hybrid lens.

8. The method of claim 6, wherein the multifocal lens comprises at least one of: a Pancharatnam-Berry phase (PBP) lens; a polarization volume holographic liquid crystal (LC) lens; or an LC Fresnel lens, and wherein switching the optical power of the multifocal lens comprises switching the optical power of the at least one of PBP lens, the polarization volume holographic LC lens, or the LC Fresnel lens.

9. A hybrid lens for collimating image light, the hybrid lens comprising a varifocal lens and an adaptive lens optically coupled to the varifocal lens and comprising a voltage-controlled element for varying optical power of the adaptive lens in coordination with varying optical power of the varifocal lens based on a pre-determined mutual variation of the optical power for lessening an off-axis aberration of the hybrid lens with respect to the image light for each sub-range of a pre-defined set of sub-ranges of optical powers of the hybrid lens with respect to the image light.

10. The hybrid lens of claim 9, wherein the adaptive lens is disposed in an optical path downstream of the varifocal lens.

11. The hybrid lens of claim 9, wherein the varifocal lens comprises a liquid lens.

12. The hybrid lens of claim 9, wherein the adaptive lens comprises at least one of: a Pancharatnam-Berry phase (PBP) lens; a polarization volume holographic liquid crystal (LC) lens; or an LC Fresnel lens; and wherein a substrate of the adaptive lens comprises at least one of: a glass substrate; a plastic substrate; or a sapphire substrate.

13. The hybrid lens of claim 12, wherein the adaptive lens comprises the PBP lens comprising at least one of: a nano-patterned birefringent structure; or a polymer-embedded LC layer.

14. The hybrid lens of claim 12, wherein the voltage-controlled element comprises a first active PBP lens.

15. The hybrid lens of claim 14, wherein the adaptive lens further comprises a first switchable polarization rotator optically coupled to the first active PBP lens.

16. The hybrid lens of claim 15, wherein the adaptive lens further comprises a second active PBP lens and a second switchable polarization rotator optically coupled to the second active PBP lens.

17. A hybrid lens apparatus comprising the hybrid lens of claim 9 and a controller operably coupled to the varifocal lens and the voltage-controlled element of the adaptive lens and configured to vary the optical power of the varifocal lens in coordination with varying voltage applied to the voltage-controlled element, thereby lessening the off-axis aberration of the hybrid lens as optical power of the hybrid lens is varied.

18. The hybrid lens apparatus of claim 17, wherein the controller is configured to increase the optical power of the adaptive lens when increasing the optical power of the varifocal lens, and to decrease the optical power of the adaptive lens when decreasing the optical power of the varifocal lens.

19. The hybrid lens apparatus of claim 17, wherein:
the varifocal lens comprises a liquid lens comprising a pair of immiscible fluids separated by a boundary having a voltage-variable radius of curvature for varying optical power of the liquid lens; and
the controller is configured to vary the radius of curvature of the boundary by varying a voltage applied to the liquid lens in coordination with varying a voltage applied to the voltage-controlled element of the adaptive lens, thereby lessening the off-axis aberration of the hybrid lens as the optical power of the liquid lens is varied.

20. The hybrid lens apparatus of claim 19, wherein the adaptive lens comprises an LC PBP lens, and wherein the voltage-controlled element comprises a voltage-controlled polarization rotator.

* * * * *